United States Patent [19]

Hashizume

[11] Patent Number: 5,631,990

[45] Date of Patent: May 20, 1997

[54] INTEGRATED OPTICAL MODULE FOR COUPLING AN OPTICAL FIBER TO AN OPTICAL DEVICE

[75] Inventor: Hideki Hashizume, Kanagawa, Japan

[73] Assignee: Nippon Sheet Glass Co., Ltd., Japan

[21] Appl. No.: 516,626

[22] Filed: Aug. 18, 1995

[30]   Foreign Application Priority Data

Aug. 18, 1994 [JP] Japan ................... 6-194452

[51] Int. Cl.⁶ ..................................... G02B 6/42
[52] U.S. Cl. ........................................... 385/92
[58] Field of Search ........................... 385/88–94

[56]   References Cited

U.S. PATENT DOCUMENTS

| | | | |
|---|---|---|---|
| 4,547,039 | 10/1985 | Caron et al. | 385/88 |
| 4,747,656 | 5/1988 | Miyahara et al. | 385/88 X |
| 5,127,073 | 6/1992 | Mulholland et al. | 385/92 |
| 5,140,663 | 8/1992 | Edwards et al. | 385/90 |

FOREIGN PATENT DOCUMENTS

| | | |
|---|---|---|
| 3-34725 | 7/1991 | Japan . |
| 4-165312 | 11/1992 | Japan . |
| 6-67063 | 3/1994 | Japan . |

*Primary Examiner*—John D. Lee
*Attorney, Agent, or Firm*—Merchant, Gould, Smith, Edell, Welter & Schmidt

[57]   ABSTRACT

An optical module for receiving a plug connected to an optical fiber includes a receptacle having an optical device, a holder composed of a plurality of bodies for gripping the receptacle, the holder having an engaging tongue for engaging the plug when the plug is connected to the receptacle, and a housing combinable with the holder while the holder is gripping the receptacle, whereby the housing, the receptacle, and the holder can jointly make up an integral assembly.

9 Claims, 3 Drawing Sheets

INTEGRATED OPTICAL MODULE FOR COUPLING AN OPTICAL FIBER TO AN OPTICAL DEVICE

BACKGROUND OF THE INVENTION

1. Field of the Invention

The present invention relates to an optical module for use in an optical signal transmission system, and more particularly to an optical module incorporating an optical device such as a light-emitting device or a light-detecting device, the optical module being capable of receiving a plug connected to an optical fiber for optical connection with such an optical device.

2. Description of the Prior Art

Optical modules for optically coupling an optical device such as a light-emitting device or a light-detecting device and an optical fiber have heretofore been known from Japanese utility model publication No. 3-34725, Japanese laid-open patent publications Nos. 4-165312 and 6-67063, for example.

The optical module disclosed in Japanese utility model publication No. 3-34725 has an optical device such as a light-emitting device or a light-detecting device which is fixed to an optical module body by an adhesive, a screw or the like.

The optical module revealed in Japanese laid-open patent publication No. 4-165312 includes a receptacle having a light-emitting device or a light-detecting device. To fasten the receptacle to a housing, a portion of the housing around the receptacle is affixed to a flange of the receptacle by staking, or if the housing is made of resin, it is held by a plate and secured to the flange of the receptacle by riveting, or it is locally fused to the flange of the receptacle.

The optical module shown in Japanese laid-open patent publication No. 6-67063 has two housing blocks assembled into one housing.

Fixing the optical device to the optical module body with an adhesive or a screw as disclosed in Japanese utility model publication No. 3-34725 requires a complex assembling process. Use of a screw, in particular, entails an additional cost of tapping the optical module body. The flange of the receptacle for attachment to the housing as revealed in Japanese laid-open patent publication No. 4-165312 makes the overall arrangement complicated. The structure as shown in Japanese laid-open patent publication No. 6-67063 cannot easily be assembled as the two housing blocks cannot be put together in one operation.

SUMMARY OF THE INVENTION

It is therefore an object of the present invention to provide an optical module for use in an optical signal transmission system, which optical module can easily be optically connected to a plug connected to an optical fiber, can easily be assembled, and is composed of inexpensive parts.

According to the present invention, there is provided an optical module for receiving a plug connected to an optical fiber, comprising a receptacle having an optical device, a holder composed of a plurality of bodies for gripping the receptacle, the holder having an engaging tongue for engaging the plug when the plug is connected to the receptacle, and a housing combinable with the holder while the holder is gripping the receptacle, whereby the housing, the receptacle, and the holder can jointly make up an integral assembly.

The holder is composed of a pair of half bodies of identical shape, and each of the half bodies has the engaging tongue and at least one engaging member. The receptacle has engageable regions for being engaged by the engaging members of the half bodies when the receptacle is gripped between the half bodies.

The half bodies have respective engageable members, the housing having engaging members engageable with the respective engageable members of the half bodies when the receptacle is gripped between the half bodies.

The half bodies are put together into the holder in sandwiching relation to the receptacle, and then the housing is placed downwardly over the holder. The housing is thus combined with the holder in one operation, with all the components integrally assembled into the optical module.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
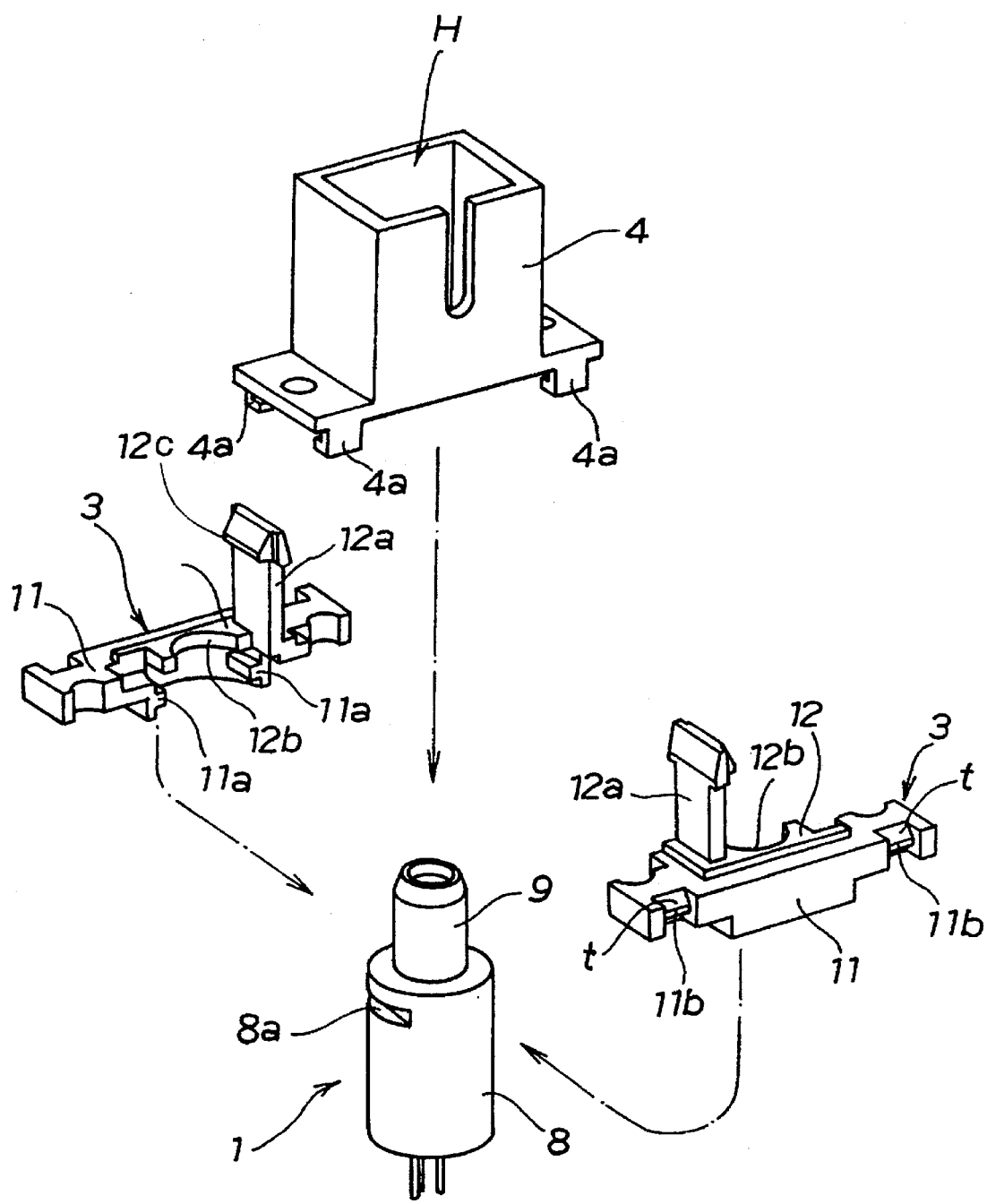
FIG. 1 is an exploded perspective view of an optical module according to the present invention.

As shown in FIG. 1, an optical module according to the present invention comprises a receptacle 1 having disposed therein an optical device such as a light-emitting device or a light-detecting device, a holder 2 (see FIG. 2) for holding or gripping the receptacle 1, and a housing 4 for holding the holder 2.

Figure 4:
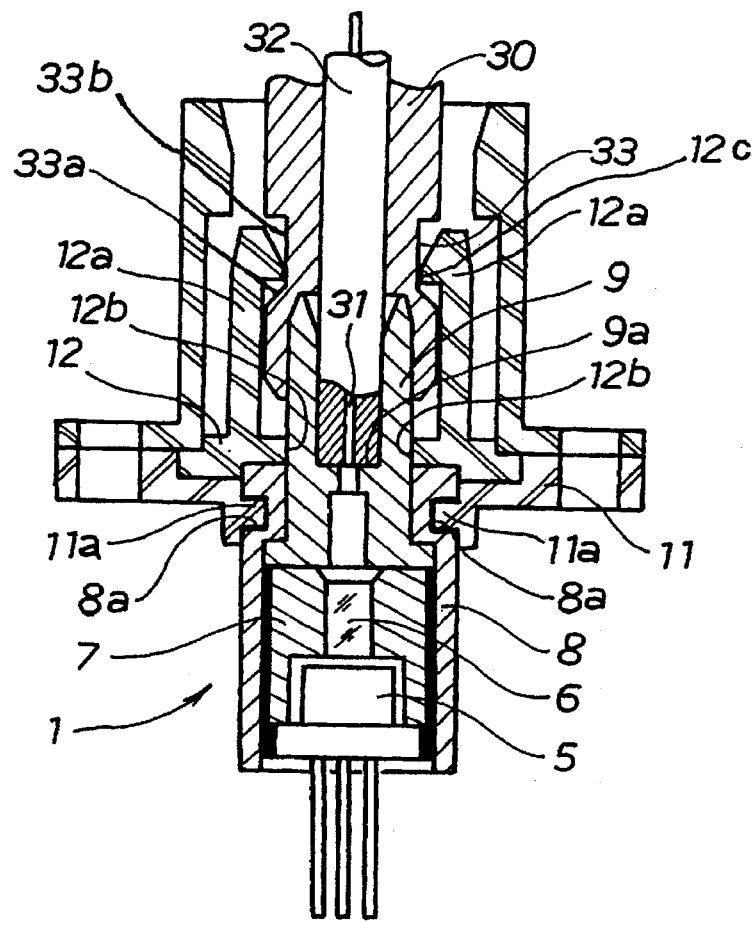
FIG. 4 is a cross-sectional view taken along line IV—IV of FIG. 3.

As shown in FIG. 4, the receptacle 1 comprises a light-emitting device 5 in the form of a hermetically sealed laser diode (LD), a lens 6 positioned in front of the light-emitting device 5, a lens holder 7 holding the lens 6, an outer sleeve 8 surrounding the lens holder 7, and a ferrule bushing 9 disposed in front of the lens holder 7.

The light-emitting device 5 may be another light-emitting device such as an LED (Light-Emitting Diode), an SLED (Super Light-Emitting Diode), or the like, rather than the laser diode. Alternatively, a light-detecting device such as a Pin-PD (Photodiode), an APD (Avalanche Photodiode), or the like may be used instead of the light-emitting device 5.

As shown in FIGS. 1 and 4, the outer sleeve 8 has two diametrically opposite engageable slots 8a defined in its outer circumferential surface near one end thereof, each of the engageable slots 8a having a predetermined length in a direction across the axis of the outer sleeve 8.

The receptacle 1 is assembled as follows: After the lens 6 is fixed to the lens holder 7 by glass of low melting point, the light-emitting device 5 is aligned with the lens holder 7 in an X-Y plane normal to its optical axis (Z-axis) such that a light beam emitted by the light-emitting device 5 will be aligned with the center of the lens 6, and then the light-emitting device 5 is resistance-welded to the lens holder 7. The light-emitting device 5 is positioned in the direction of the Z-axis with respect to the lens 6 by determining such a distance between the light-emitting device 5 and the lens 6 as to position a focused spot on a ferrule stopper 9a of the ferrule bushing 9 in an optical coupling experiment on a bench test, and using a spacer corresponding to the determined distance between the light-emitting device 5 and the lens 6.

After the light-emitting device 5 and the lens 6 are installed in the lens holder 7, the lens holder 7 is attached to the ferrule bushing 9. Specifically, the relative position of the lens holder 7 and the ferrule bushing 9 is adjusted by installing an intensity monitor optical fiber on the ferrule bushing 9, setting the lens holder 7 and the ferrule bushing 9 on an alignment device, tuning on the light-emitting device 5, and aligning the lens holder 7 and the ferrule bushing 9 with each other in the X-Y plane until the intensity of light transmitted through the intensity monitor optical fiber is maximized. Thereafter, the coupling surfaces of the lens holder 7 and the ferrule bushing 9 are secured to each other by YAG laser spot welding.

The holder 2 comprises a pair of half bodies 3 of identical shape. The half bodies 3 and the housing 4 are injection-molded of a resin material composed of polybutylene terephthalate (PBT) with an inorganic filler mixed therein. As show in FIGS. 1 and 4, each of the half bodies 3 comprises a holder body 11 having a pair of engaging ridges 11a, and an inner member 12 having a plug engaging tongue 12a and an arcuate recess 12b, the holder body 11 and the inner member 12 being integrally joined to each other. The engaging ridges 11a of both the half bodies 3 serve to hold the receptacle 1. The plug engaging tongue 12a projects from one end of the inner member 12, and the arcuate recess 12b is defined centrally in the inner member 12.

When the half bodies 3 are positioned on the receptacle 1 in diametrically opposite relation to each other, sandwiching the receptacle 1, as indicated by the dot-and-dash line in FIG. 1, the engaging ridges 11a confront, and are aligned with, each other in two pairs, and enter the engageable slots 8a, thus holding the receptacle 1. Each of the engaging ridges 11a has a length which is about half the length of one of the engageable slots 8a.

The arcuate recesses 12b of the inner members 12 of the half bodies 3 jointly receive an outer circumferential surface of the ferrule bushing 9. As shown in FIG. 4, when a ferrule 32 fitted over an optical fiber 31 of a plug 30 is inserted into the ferrule bushing 9, the plug engaging tongues 12a of the inner members 12 of the half bodies 3 resiliently engage in an engageable groove 33 defined in an outer circumferential surface of the plug 30. The engageable groove 33 has a tapered surface 33a near the tip end of the plug 30 and a deepest surface 33b remote from the tip end of the plug 30. As a result, when the ferrule 32 is inserted into the ferrule bushing 9, respective engaging teeth 12c of the engaging tongues 12a resiliently slide down the tapered surface 33a radially inwardly onto the deepest surface 33b in a manner to urge the plug 30 in an axial direction to connect the plug 30 to the receptacle 1 or force the ferrule 32 into the ferrule bushing 9.

Each of the holder bodies 11 has a pair of engageable teeth 11b positioned one on each side of the inner member 12, each of the engageable teeth 11b having an upper tapered surface "t". The pairs of engageable teeth 11b of the holder bodies 11 engage respective pairs of engaging teeth 4a, respectively, of the housing 4.

While the half bodies 3 have the respective pairs of engaging ridges 11a and the respective engaging tongues 12a, only one of the half bodies 3 may have a pair of engaging ridges 11a or a pair of engaging tongues 12a. However, the half bodies 3 which have the respective pairs of engaging ridges 11a and the respective engaging tongues 12a, as shown, can be manufactured inexpensively.

Figure 5:
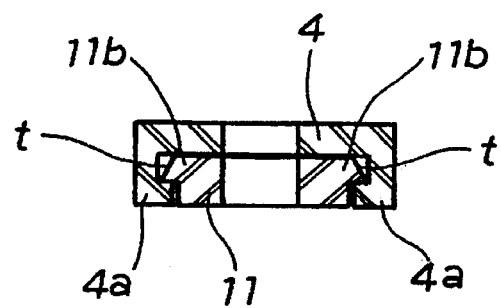
FIG. 5 is a cross-sectional view taken along line V—V of FIG. 3.

The housing 4 has an internal shape constructed to dimensions which are specified under JIS (Japan Industrial Standards) C 5973 for F04 type fiber connectors (so-called SC connectors). The engaging teeth 4a are mounted on respective four corners of the bottom of the housing 4. The engaging teeth 4a are substantially channel-shaped as viewed in a transverse cross section. The engaging teeth 4a of transverse pairs are resiliently flexible such that the lower ends thereof can spread outwardly away from each other. Specifically, as shown in FIG. 5, when the engaging teeth 4a are pressed against the tapered surfaces "t" of the engageable teeth 11b of the holder bodies 11, the lower ends of the engaging teeth 4a spread outwardly along the tapered surfaces "t", and then resiliently snap inwardly underneath the engageable teeth 11b, thereby securely holding the engageable teeth 11b and hence the holder bodies 11.

Figure 2:
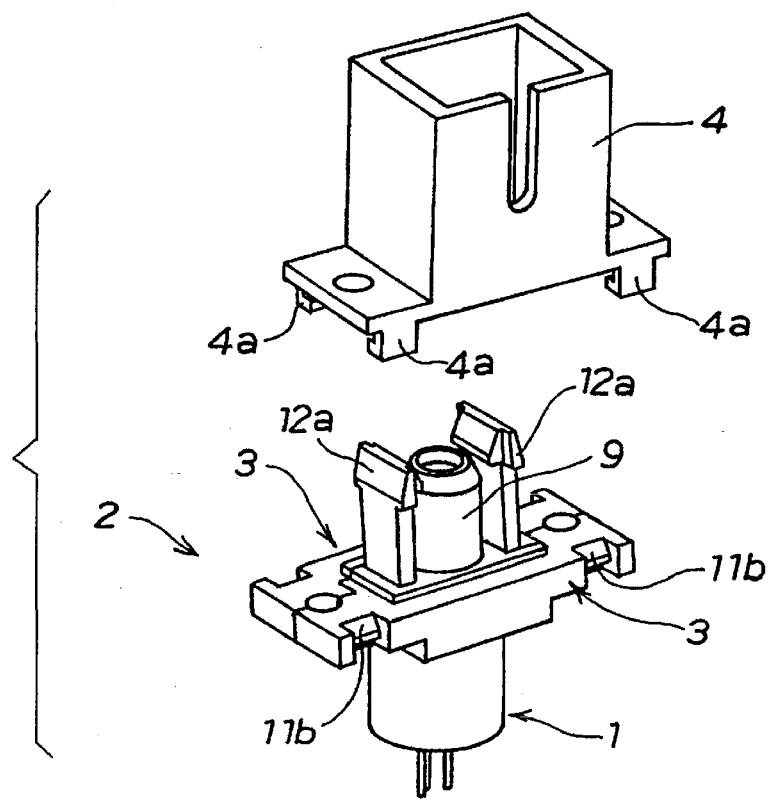
FIG. 2 is a perspective view of the optical module as it is being assembled.
Figure 3:
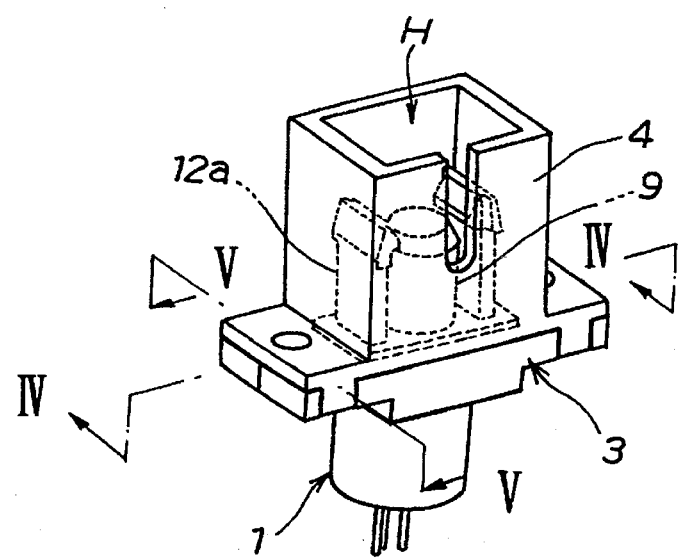
FIG. 3 is a perspective view of the optical module after it has been assembled.

The optical module is assembled as follows: First, as shown in FIG. 2, the half bodies 3 are brought into sandwiching relation to the receptacle 1, causing the engage ridges 11a of the holder bodies 11 to engage in the engageable slots 8a of the outer sleeve 8. Thereafter, the housing 4 is placed downwardly over the ferrule bushing 9 and the plug engaging tongues 12a until the engaging teeth 4a snap resiliently over the engageable teeth 11b. Now, the receptacle 1, the holder 2 (composed of the combined half bodies 3), and the housing 4 are put together into an integral assembly. The parts of the optical module can easily be assembled simply by putting them together without tightening screws, applying an adhesive, or involving any other additional fastening process.

As described above, the optical module according to the present invention has a holder composed of half bodies separable from each other and combinable with each other, the half bodies having respective engaging ridges engageable in respective slots in a receptacle, so that the receptacle can be held by the holder. The holder composed of the combined half bodies can engage a housing in one operation and be held by the housing. The optical module does not entail any cost of tapping any component thereof, has components shaped relatively simply, and can be assembled easily.

After the holder had been installed on the receptacle producing the optical module, a plug of an F04 type fiber connector specified under JIS C 5973 was repeatedly attached to and detached from the optical module to confirm the reproducibility of an optically connected state. When the plug was repeatedly attached to and detached from the optical module 300 times, the coupling loss suffered a full variation of 0.22 dB at the time the plug was a plug for a GI-50 fiber having a core diameter of 50 µm and a full variation of 0.45 dB at the time the plug was a plug for a single-mode fiber (SMF) having a core diameter of 9 µm. Therefore, the optical module according to the present invention can achieve a satisfactory optically coupled condition.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

What is claimed is:

1. An optical module for receiving a plug connected to an optical fiber, comprising:

a receptacle having an optical device;

a holder composed of a plurality of bodies for gripping said receptacle, said holder having an engaging tongue for engaging the plug when the plug is connected to said receptacle; and a housing combinable with said holder so as to cover and accommodate said holder and said engaging tongue therein while the holder is gripping said receptacle, whereby said housing, said receptacle and said holder can jointly make up an integral assembly.

2. An optical module according to claim 1, wherein said holder is composed of a pair of half bodies of identical shape, each of said half bodies having said engaging tongue and at least one engaging member, said receptacle having engageable regions for being engaged by the engaging members of the half bodies when the receptacle is gripped between said half bodies.

3. An optical module according to claim 2, wherein said half bodies have respective engageable members, said housing having engaging members engageable with the respective engagable members of said half bodies when the receptacle is gripped between said half bodies.

4. An optical module according to claim 3, wherein said engageable members of said half bodies comprise respective engageable teeth, said engaging members of said housing comprising respective engaging teeth for engaging said engageable teeth of the half bodies.

5. An optical module according to claim 2, wherein said engaging members of said half bodies comprise respective engaging ridges, said engageable regions comprising respective engageable slots for receiving said engaging ridges, respectively.

6. An optical module according to claim 2, wherein said plug has an engaging groove including a tapered surface and a deepest surface continuous thereto, said engaging tongues of said half bodies having respective engaging teeth for engaging in said engaging groove of said plug, the arrangement being such that when said plug and said receptacle are connected to each other, said engaging teeth of said engaging tongues slide down said tapered surface onto said deepest surface in a manner to force said plug in a direction to be connected to said receptacle.

7. An optical module for receiving a plug connected to an optical fiber, comprising:

a receptacle having an optical device;

a holder composed of a pair of bodies, each of said pair of bodies comprising a recess, said holder having an aperture therethrough to receive said receptacle, a perimeter of said aperture formed by said recesses when said pair of bodies is assembled, said holder also having an engaging tongue for engaging the plug when the plug is connected to said receptacle; and a housing having an hole therethrough to receive said receptacle, said engaging tongue and the plug, said housing closely fittable around said holder so as to push said holder into gripping contact with said receptacle.

8. An optical module for receiving a plug connected to an optical fiber, the module comprising:

a barrel-shaped receptacle having an optical device contained therein, said receptacle having an axis;

a holder formed from a plurality of holder parts, the holder comprising a ridge engageable with said receptacle and adapted to prevent rotation of said receptacle within said holder, and an engaging tongue, said holder having an aperture therein to receive said receptacle; and a housing adapted to receive said receptacle, said engaging tongue and the plug, and adapted to urge said holder parts axially inwards so as to lockingly engage said holder with said receptacle.

9. The optical module of claim 8, wherein said receptacle comprises a slot perpendicular to said axis to receive said ridge, said holder further comprises a plurality of holder engageable teeth and said housing comprises a plurality of housing engageable teeth, teeth of said plurality of housing engageable teeth each adapted to engage respective teeth of said plurality of holder engageable teeth so as to lock said holder in engagement with said housing.

* * * * *